(12) United States Patent
Sakai et al.

(10) Patent No.: US 12,195,627 B2
(45) Date of Patent: Jan. 14, 2025

(54) POLYIMIDE RESIN COMPOSITION

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 815 days.

(21) Appl. No.: 17/051,105

(22) PCT Filed: May 8, 2019

(86) PCT No.: PCT/JP2019/018368
§ 371 (c)(1),
(2) Date: Oct. 27, 2020

(87) PCT Pub. No.: WO2019/220968
PCT Pub. Date: Nov. 21, 2019

(65) Prior Publication Data
US 2021/0253856 A1 Aug. 19, 2021

(30) Foreign Application Priority Data
May 17, 2018 (JP) .................. 2018-095747

(51) Int. Cl.
*C08L 79/08* (2006.01)
*C08G 73/10* (2006.01)
*C08G 73/14* (2006.01)
*C08K 5/00* (2006.01)
*C08K 5/5313* (2006.01)
*C08K 5/5377* (2006.01)

(52) U.S. Cl.
CPC .......... *C08L 79/08* (2013.01); *C08G 73/1042* (2013.01); *C08G 73/1082* (2013.01); *C08G 73/14* (2013.01); *C08K 5/0066* (2013.01); *C08K 5/5313* (2013.01); *C08K 2201/003* (2013.01); *C08L 2201/08* (2013.01); *C08L 2203/30* (2013.01)

(58) Field of Classification Search
None
See application file for complete search history.

(56) References Cited

U.S. PATENT DOCUMENTS

| | | |
|---|---|---|
| 2006/0074157 A1 | 4/2006 | Bauer et al. |
| 2012/0097439 A1 | 4/2012 | Goshima et al. |
| 2012/0301718 A1 | 11/2012 | Nishiura et al. |
| 2016/0177062 A1 | 6/2016 | Sato et al. |
| 2016/0340588 A1 * | 11/2016 | Bauer ............... C09K 21/04 |
| 2017/0130003 A1 | 5/2017 | Sato |

FOREIGN PATENT DOCUMENTS

| | | |
|---|---|---|
| CN | 1660857 A | 8/2005 |
| CN | 104744938 A1 * | 7/2015 |
| CN | 104804186 A | 7/2015 |
| JP | 2005-28524 A | 2/2005 |
| JP | 2006-22205 A | 1/2006 |
| JP | 2007-231246 A | 9/2007 |
| JP | 2010117452 A * | 5/2010 |
| JP | 2010-260906 A | 11/2010 |
| JP | 2011-12271 A | 1/2011 |

(Continued)

OTHER PUBLICATIONS

International Search Report issued on Aug. 13, 2019 in PCT/JP2019/018368 filed on May 8, 2019, 2 pages.

(Continued)

*Primary Examiner* — Tae H Yoon
(74) *Attorney, Agent, or Firm* — Oblon, McClelland, Maier & Neustadt, L.L.P.

(57) ABSTRACT

A polyimide resin composition containing a polyimide resin (A) and a phosphinic acid metal salt-based flame retardant (B), the polyimide resin (A) containing repeating structural units of formulae (1) and (2):

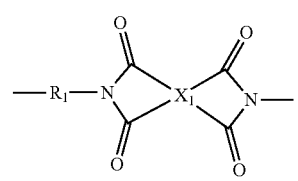

(1)

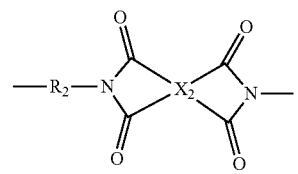

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring, and a content ratio of the repeating structural unit of formula (1) with respect to the total of the repeating structural unit of formula (1) and the repeating structural unit of formula (2) is 20 to 70 mol %.

8 Claims, No Drawings

(56) References Cited

FOREIGN PATENT DOCUMENTS

| | | | |
|---|---|---|---|
| JP | 2012-144653 | A | 8/2012 |
| JP | 2012-193300 | A | 10/2012 |
| JP | 5327771 | B2 | 10/2013 |
| JP | 2014-122329 | A | 7/2014 |
| JP | 2016-191029 | A | 11/2016 |
| WO | WO 2010/021899 | A1 * | 2/2010 |
| WO | WO 2011/093079 | A1 | 8/2011 |
| WO | WO 2015/064280 | A1 | 5/2015 |
| WO | WO 2016/147996 | A1 | 9/2016 |
| WO | WO 2016/147997 | A1 | 9/2016 |

OTHER PUBLICATIONS

Hitoshi Nishizawa, "Flame-retardant polymer materials (III) flame retardants", Japan Rubber Association Journal, 2013, vol. 86, No. 6, p. 341-347, URL: https://www.jstage.jst.go.jp/article/gomu/86/11/86_341/_pdf (with English Translation).

Yasuhiro Osanishi, "Non-halogen phosphorus flame retardants for engineering plastics", Journal of Material Life Society, 2010, vol. 22, No. 3, p. 110-114, URL: https:/www.istage.jst go.jp/article/mis/22/3/22 110/ pdf/-char/ja (with English Translation).

Yoshio Imai, "Structure and physical properties of polyimide", Journal of the Electronics Packaging Society, Sep. 15, 2023, vol. 4, No. 7, 2001, 640-646, URL: https://www.jstag e-jst.go.jp/article/jiep1998/4/7/4_7_640/_pdf/-char/ja (with English Translation).

* cited by examiner

POLYIMIDE RESIN COMPOSITION

CROSS-REFERENCE TO RELATED APPLICATIONS

The present application is a national stage entry of PCT Application PCT/JP2019/018368, filed May 8, 2019, which claims the benefits of priority to Japanese Application JP 2018-095747 filed on May 17, 2018.

TECHNICAL FIELD

The present invention relates to a polyimide resin composition.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

Studies have also been made to improve flame resistance by adding a flame retardant to a thermoplastic polyimide resin in order to apply to applications where flame resistance is required. For example, PTL 2 discloses an adhesive film in which an adhesive layer containing a thermoplastic polyimide and a flame retardant is provided on at least one surface of an insulating film.

PTL 3 discloses a flame retardant composition comprising a mixture formed by dry blending a resin, such as a polyimide, having an average particle size of 1000 μm or less with magnesium hydroxide or aluminum hydroxide. PTL 4 and 5 describe that a polyimide resin containing a predetermined repeating unit may be mixed with an additive such as a flame retardant to obtain a resin composition.

CITATION LIST

Patent Literature

PTL 1: JP-A-2005-28524
PTL 2: JP-A-2006-22205
PTL 3: JP-B-5327771
PTL 4: WO 2016/147996
PTL 5: WO 2016/147997

SUMMARY OF INVENTION

Technical Problem

Although the thermoplastic polyimide resins containing an aliphatic structure disclosed in PTL 4 and 5 are superior in molding processability to wholly aromatic polyimide resins, they tend to have poor flame resistance. Therefore, for example, it was difficult to impart flame resistance with a high V-0 level in the UL94 standard, which is a flame resistance test standard for plastic materials published by Underwriters Laboratories Inc. Although increasing the amount of flame retardant added to the thermoplastic polyimide resin improves flame resistance, on the other hand, there is a problem in that appearance deteriorates due to bleed-out of the flame retardant.

An object of the present invention is to provide a polyimide resin composition having molding processability and that can achieve both high flame resistance and a good appearance.

Solution to Problem

The present inventors have found that the aforementioned object can be attained by a polyimide resin composition containing a polyimide resin in which particular different polyimide structural units are combined at a particular ratio and a particular flame retardant.

That is, the present invention provides a polyimide resin composition containing a polyimide resin (A) and a phosphinic acid metal salt-based flame retardant (B), the polyimide resin (A) containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being 20 to 70 mol %.

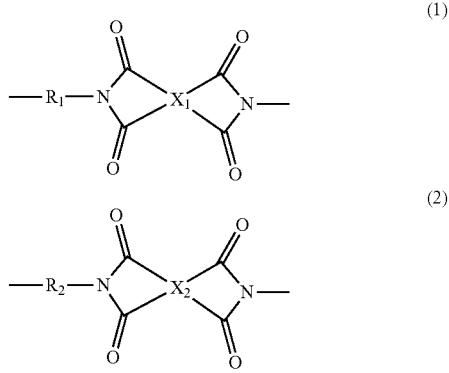

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

Advantageous Effects of Invention

The polyimide resin composition of the present invention is excellent in molding processability and that can achieve both high flame resistance and a good appearance. The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, carbon UD tape, thermal insulation materials, and the like. The molded articles, which are excellent in mechanical properties and heat resistance, also can replace various metals including aluminum alloys and magnesium alloys.

DESCRIPTION OF EMBODIMENTS

[Polyimide Resin Composition]

The polyimide resin composition of the present invention contains a polyimide resin (A) and a phosphinic acid metal salt-based flame retardant (B), the polyimide resin (A) containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being 20 to 70 mol %.

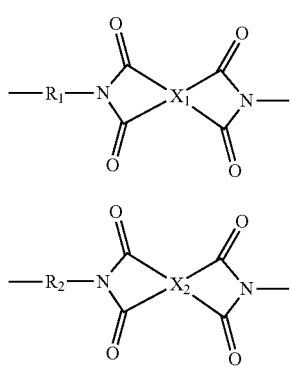

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin composition of the present invention is a resin composition that exhibits thermoplasticity and is excellent in molding processability due to containing the polyimide resin (A) in which particular different polyimide structural units are combined at the particular ratio described above. By combining the polyimide resin (A) with a specific flame retardant (B), it is possible to achieve both high flame resistance and a good appearance in the obtained polyimide resin composition and a molded article thereof. When a flame retardant other than the phosphinic acid metal salt-based flame retardant (B) is used, at least one of flame resistance and appearance tends to be inferior.

<Polyimide Resin (A)>

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

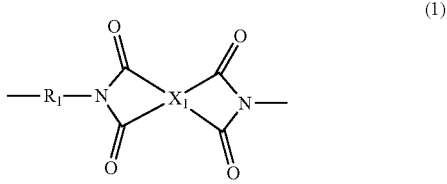

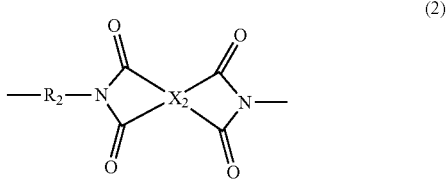

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula ($R_1$-1) or ($R_1$-2):

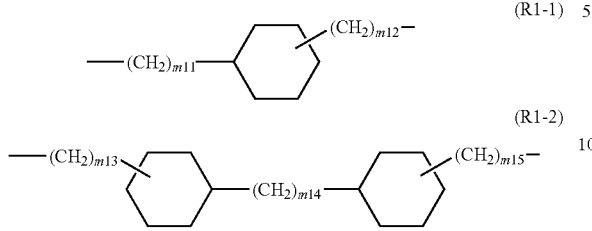

(R1-1)

(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

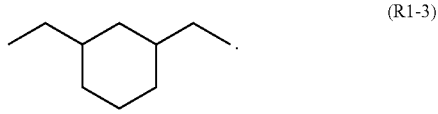

(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

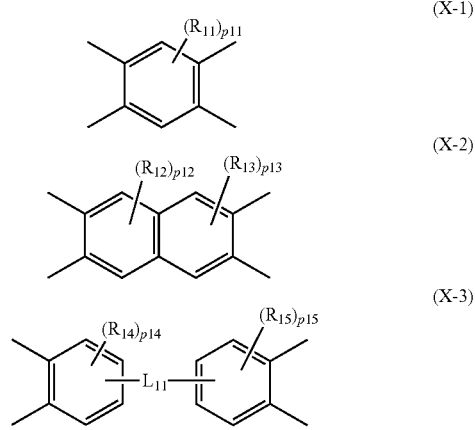

(X-1)

(X-2)

(X-3)

(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{14}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

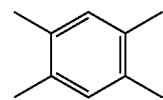

(X-5)

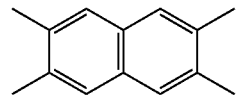

(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

(R2-1)

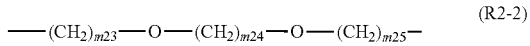
(R2-2)

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less in consideration of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the ratio falls within this range, the crystallinity of the polyimide resin (A) increases, and it is possible to obtain a resin composition being more excellent in heat resistance.

The content ratio described above is preferably 25 mol % or more, more preferably 30 mol % or more, further preferably 32 mol % or more in consideration of molding processability, and is further preferably 35 mol % or less in consideration of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

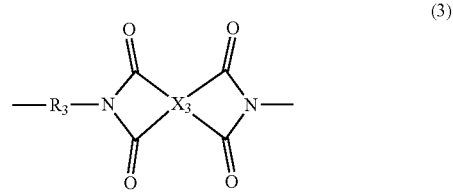
(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C(CF$_3$)$_2$— and —(CF$_2$)$_p$— (wherein p is an integer of 1-10), as well as —CO—, —SO$_2$—, —SO—, —CONH—, and —COO—.

$R_3$ is preferably a divalent group represented by the following formula (R3-1) or (R3-2):

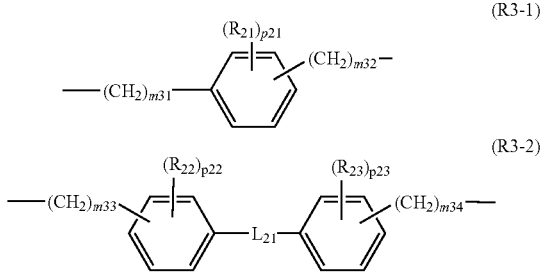

(R3-1)

(R3-2)

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

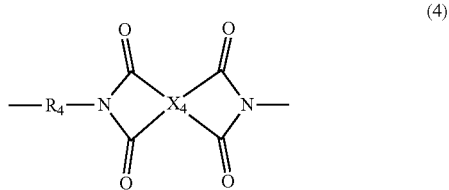

(4)

wherein $R_4$ represents a divalent group containing —$SO_2$— or —$Si(R_x)(R_y)O$—; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms in consideration of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof in consideration of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) in consideration of exerting excellent heat aging resistance. In order that a sufficient molecular weight is ensured and good mechanical properties are achieved, the content of the chain aliphatic group having from 5 to 14 carbon atoms in the polyimide resin (A) is preferably 10 mol % or less, more preferably 6 mol % or less and further preferably 3.5 mol % or less based on the total 100 mol % of the total repeating structural units constituting the polyimide resin (A).

The content of the chain aliphatic group having from 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin is more preferably 280° C. or more and further preferably 290° C. or more in consideration of heat resistance, and is preferably 345° C. or less, more preferably 340° C. or less, and further preferably 335° C. or less in consideration of exerting high molding processability. In addition, the glass transition temperature of the polyimide resin (A) is more preferably 160° C. or more and more preferably 170° C. or more in consideration of heat resistance, and is preferably 250° C. or less, more preferably 230° C. or less, and further preferably 200° C. or less in consideration of exerting high molding processability.

Both the melting point and the glass transition temperature of the polyimide resin can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more in consideration of enhancement of crystallinity, heat resistance, mechanical strength, and chemical resistance. The upper limit of the exothermic amount of crystallization is not particularly limited, and is usually 45.0 mJ/mg or less.

Specifically, the melting point, the glass transition temperature, and the exothermic amount of crystallization of the polyimide resin can be measured by the methods described in Examples.

The logarithmic viscosity of the polyimide resin (A) at 30° C. in a 5 mass % concentrated sulfuric acid solution is preferably 0.2 to 2.0 dug and more preferably 0.3 to 1.8 dL/g. When the logarithmic viscosity is 0.2 dug or more, a molded article formed of the polyimide resin composition obtained has sufficient mechanical strength, and when the logarithmic viscosity is 2.0 dL/g or less, molding processability and handleability are good. The logarithmic viscosity p is obtained according to the following expression by measuring the elapsed times for flowing concentrated sulfuric acid and the polyimide resin solution at 30° C. with a Cannon-Fenske viscometer.

$$\mu = \ln(t_s/t_0)/C$$

$t_0$: elapsed time for flowing concentrated sulfuric acid
$t_s$: elapsed time for flowing polyimide resin solution
C: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A) is 10,000 or more, the mechanical strength of a molded article obtained is good, when the Mw is 40,000 or more, the mechanical strength stability is good, and when the Mw is 150,000 or less, the molding processability is good.

The weight average molecular weight Mw of the polyimide resin (A) can be measured by a gel permeation chromatography (GPC) method using polymethyl methacrylate (PMMA) as a standard sample.

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3', 4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less in consideration of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

In addition, the molar ratio is preferably 12 mol % or less, more preferably 10 mol % or less, further preferably 5 mol % or less and still more preferably 0 mol % in consideration of a decrease in coloration of the polyimide resin.

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Examples of the monoamine end capping agent include methylamine, ethylamine, propylamine, butylamine, n-pentylamine, n-hexylamine, n-heptylamine, n-octylamine, n-nonylamine, n-decylamine, n-undecylamine, laurylamine, n-tridecylamine, n-tetradecylamine, isopentylamine, neopentylamine, 2-methylpentylamine, 2-methylhexylamine, 2-ethylpentylamine, 3-ethylpentylamine, isooctylamine, 2-ethylhexylamine, 3-ethylhexylamine, isononylamine, 2-ethyloctylamine, isodecylamine, isododecylamine, isotridecylamine, isotetradecylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline.

The dicarboxylic acid end capping agent is preferably a dicarboxylic acid compound, which may partially have a closed ring structure. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferred.

Such an end capping agent may be used singly or in combinations of two or more.

Among these, the monoamine end capping agent is preferable, and a monoamine containing a chain aliphatic group having from 5 to 14 carbon atoms is more preferable and a monoamine containing a saturated linear aliphatic group having from 5 to 14 carbon atoms is further preferable in consideration of introduction of the chain aliphatic group having from 5 to 14 carbon atoms into the end of the polyimide resin (A) for enhancement of heat aging resistance. The chain aliphatic group preferably has 6 or more carbon atoms, more preferably has 7 or more carbon atoms and further preferably has 8 or more carbon atoms, and preferably has 12 or less carbon atoms, more preferably has 10 or less carbon atoms and further preferably has 9 or less carbon atoms. A monoamine containing a chain aliphatic group having 5 or more carbon atoms is preferable because of being hardly volatilized in production of the polyimide resin (A).

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and examples thereof include, for example, solution polymerization, melt polymerization, solid phase polymerization, suspension polymerization and the like while not particularly limited. Among these, suspension polymerization under a high temperature condition using an organic solvent is preferred. On performing suspension polymerization under a high temperature condition, the polymerization is preferably performed at 150° C. or more, and more preferably at from 180 to 250° C. The polymerization time may vary depending on the monomers used, and is preferably approximately from 0.1 to 6 hours.

The method for producing the polyimide resin (A) preferably includes the step of reacting the tetracarboxylic acid component with the diamine component in the presence of a solvent containing an alkylene glycol-based solvent represented by the following formula (I). In this way, the polyimide resin excellent in handleability may be obtained in a powder form:

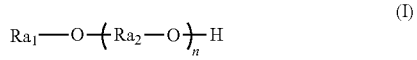

$$Ra_1\text{—}O\text{—}(Ra_2\text{—}O)_n\text{—}H \quad (I)$$

wherein $Ra_1$ represents a hydrogen atom or an alkyl group having from 1 to 4 carbon atoms; $Ra_2$ represents a linear alkylene group having from 2 to 6 carbon atoms; and n represents an integer of 1-3.

In order to obtain a homogeneous powder polyimide resin, it is considered to be desirable that the solvent in a one-pot reaction possess two properties of (1) homogeneously dissolving a polyamic acid or homogeneously dispersing a nylon salt, and (2) not dissolving and swelling the polyimide resin at all. A solvent comprising the alkylene glycol-based solvent represented by the formula (I) generally satisfies the two properties.

The alkylene glycol-based solvent has a boiling point of preferably 140° C. or more, more preferably 160° C. or more, and further preferably 180° C. or more, in consideration of feasible polymerization reaction under high temperature conditions at normal pressure.

In the formula (I), $Ra_1$ represents a hydrogen atom or an alkyl group having from 1 to 4 carbon atoms and is preferably an alkyl group having from 1 to 4 carbon atoms, and more preferably a methyl group or an ethyl group.

In the formula (I), $Ra_2$ represents a linear alkylene group having from 2 to 6 carbon atoms and is preferably a linear alkylene group having 2 or 3 carbon atoms, and more preferably an ethylene group.

In the formula (I), n represents an integer of 1-3 and is preferably 2 or 3.

Specific examples of the alkylene glycol-based solvent include ethylene glycol monomethyl ether, diethylene glycol monomethyl ether (also known as 2-(2-methoxyethoxy) ethanol), triethylene glycol monomethyl ether, ethylene glycol monoethyl ether, diethylene glycol monoethyl ether (also known as 2(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Among these solvents, 2-(2-methoxyethoxy) ethanol, triethylene glycol monomethyl ether, 2-(2-ethoxyethoxy)ethanol, and 1,3-propanediol are preferred, and 2-(2-methoxyethoxy)ethanol and 2-(2-ethoxyethoxy)ethanol are more preferred.

The content of the alkylene glycol-based solvent in the solvent is preferably 30 mass % or more, more preferably 50 mass % or more, further preferably 75 mass % or more, and further preferably 90 mass % or more. The solvent may consist of the alkylene glycol-based solvent alone.

When the solvent contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, butanol, pentanol, hexanol, heptanol, octanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination.

Preferred examples of the method for producing the polyimide resin (A) include a method which involves separately preparing (a) a solution containing the tetracarboxylic acid component in a solvent containing the alkylene glycol-based solvent and (b) a solution containing the diamine component in a solvent containing the alkylene glycol-based solvent, then adding the solution (b) to the solution (a) or adding the solution (a) to the solution (b), thereby preparing (c) a solution containing a polyamic acid, and subsequently imidizing the polyamic acid as well as depositing a polyimide resin powder in the solution (c) by the heating of the solution (c), thereby synthesizing a polyimide resin (A).

While the reaction of the tetracarboxylic acid component with the diamine component can be performed either under normal pressure or under pressure, the reaction is preferably performed under normal pressure because no pressure resistant container is required under normal pressure.

When the end capping agent is used, it is preferable to mix the solution (a) and the solution (b), mix the end capping agent with the mixed solution to prepare the solution (c) containing a polyamic acid, and subsequently heat the solution (c), and it is more preferable to add the end capping agent after completion of addition of the solution (b) to the solution (a), to prepare the solution (c) containing a polyamic acid, and subsequently heat the solution (c).

In the method for producing the polyimide resin (A), preferably, the tetracarboxylic acid component contains a tetracarboxylic dianhydride; the step of reacting the tetracarboxylic acid component with the diamine component includes: step (i) of adding (b) a solution containing the diamine component and the alkylene glycol-based solvent to (a) a solution containing the tetracarboxylic acid component and the alkylene glycol-based solvent, thereby preparing (c) a solution containing a polyamic acid; and step (ii) of imidizing the polyamic acid as well as depositing a polyimide resin powder in the solution (c) by the heating of the solution (c), thereby providing a polyimide resin powder; and in the step (i), the solution (b) is added to the solution (a) such that the amount of the diamine component added per unit time with respect to 1 mol of the tetracarboxylic acid component is 0.1 mol/min or less, in consideration of reduction in the amount of by-products in the polyimide resin (A).

<Phosphinic Acid Metal Salt-Based Flame Retardant (B)>

The polyimide resin composition of the present invention contains a polyimide resin (A) and a phosphinic acid metal salt-based flame retardant (B). By using a phosphinic acid metal salt-based flame retardant (B) as a flame retardant with a polyimide resin (A) having the specific structure described above, a flame resistance with a high V-0 level in the UL94 standard can be imparted. Further, it is possible to obtain a polyimide resin composition and a molded article in which bleed-out of the flame retardant is less likely to occur, discoloration or whitening during melt-kneading and the molding steps are less likely to occur, and which have a good appearance.

Since the polyimide resin (A) has thermoplasticity while also having high heat resistance, the melt-kneading and molding of the resin composition containing the polyimide resin (A) is preferably performed in the range of 290 to 350°

C. The phosphinic acid metal salt-based flame retardant (B) (hereinafter, simply also referred to as "flame retardant (B)") is stable and is less likely to undergo bleed-out or thermal decomposition, discoloration, whitening, and the like of the flame retardant (B) even in the above temperature range, and also has excellent dispersibility in the polyimide resin (A). Therefore, it is considered that both high flame resistance and a good appearance can be achieved when mixed in a polyimide resin composition or a molded article. Further, the amount of the flame retardant added to the resin is generally recommended to be 10 mass % or more, but since the phosphinic acid metal salt-based flame retardant (B) has high dispersibility in the polyimide resin (A), flame resistance can be exhibited even with an addition amount of less than 10 mass %. In addition, when the flame retardant (B) is used, V-0 level flame resistance can be achieved even without the combined use of an anti-drip agent such as polytetrafluoroethylene.

The flame retardant (B) is a metal salt of phosphinic acid, and preferably is a salt of at least one metal selected from the group consisting of Mg, Ca, Al, Zn, Ti, Sn, Zr, and Fe. This metal is more preferably at least one selected from the group consisting of Mg, Ca, and Al, and further preferably is Al.

More specifically, in consideration of achieving both high flame resistance and a good appearance when mixed in a polyimide resin composition or a molded article, the flame retardant (B) is preferably a compound represented by the following formula (i).

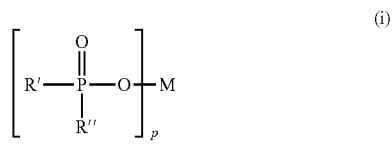

(i)

wherein R' and R" each independently represent a hydrocarbon group having from 1 to 12 carbon atoms; M represents a metal atom; and p represents a valence of the metal atom represented by M.

In the formula (i), R' and R" each independently represent a hydrocarbon group having 1 to 12 carbon atoms. Examples of the hydrocarbon group include an alkyl group, a cycloalkyl group, an alkenyl group, an aryl group, and an aralkyl group.

Examples of the alkyl group include alkyl groups having 1 to 12 carbon atoms, such as a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a lauryl group, an isopropyl group, an isobutyl group, a sec-butyl group, a t-butyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, and an isododecyl group.

Examples of the cycloalkyl group include cycloalkyl groups having 5 to 12 carbon atoms, such as a cyclopentyl group, a cyclohexyl group, a cyclooctyl group, and a cyclodecanyl group.

Examples of the alkenyl group include alkenyl groups having 2 to 12 carbon atoms, such as a vinyl group, an allyl group, a butenyl group, a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, and a dodecenyl group.

Examples of the aryl group include aryl groups having 6 to 12 carbon atoms, such as a phenyl group, a toluyl group, a biphenyl group, and a naphthyl group.

Examples of the aralkyl group include aralkyl groups having 7 to 12 carbon atoms, such as a benzyl group, a phenylethyl group, and phenylpropyl group.

Among these, R' and R" are preferably an alkyl group. The alkyl group preferably has 1 to 8 carbon atoms, more preferably 1 to 6 carbon atoms, and further preferably 1 to 3 carbon atoms.

R' and R" may be the same or different, and are preferably the same.

In the formula (i), M represents a metal atom, and is preferably at least one selected from the group consisting of Mg, Ca, Al, Zn, Ti, Sn, Zr, and Fe. M is more preferably at least one selected from the group consisting of Mg, Ca, and Al, and further preferably is Al.

The flame retardant (B) is preferably a compound (aluminum dialkylphosphinate) wherein R' and R" in the formula (i) are alkyl groups having 1 to 12 carbon atoms and M is Al. In this case, p in the formula (i) is 3. More preferable embodiments of R' and R" are the same as described above.

More preferably, the flame retardant (B) is a compound (aluminum diethylphosphinate) wherein R and R" in the formula (i) are ethyl groups and M is Al. Aluminum diethylphosphinate is a compound represented by the following structural formula (ii).

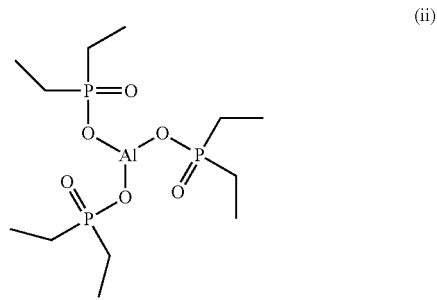

(ii)

Since the flame retardant (B) is a phosphinic acid metal salt, it is usually a solid compound, and is preferably a powder form in consideration of dispersibility in the polyimide resin (A). In consideration of achieving both high flame resistance and a good appearance, the flame retardant (B) preferably has a small particle size. In consideration of this, the particle size (D50) of the flame retardant (B) is preferably 40 μm or less, more preferably 30 μm or less, further more preferably 20 μm or less, still further preferably 10 μm or less, and even still further preferably 5 μm or less. When the particle diameter (D50) of the flame retardant (B) is 40 μm or less, particularly 10 μm or less, the resulting polyimide resin composition and molded article can have both higher flame resistance and a good appearance. The particle diameter (D50) of the flame retardant (B) is preferably 0.1 μm or more, more preferably 0.5 μm or more, and further preferably 1 μm or more.

The particle diameter (D50) of the flame retardant (B) can be measured by a laser diffraction-type particle size analyzer, and specifically by the method described in the examples.

The phosphorus content of the flame retardant (B) is preferably 10 mass % or more, more preferably 15 mass % or more, and further preferably 20 mass % or more, in consideration of imparting high flame resistance. Further, the phosphorus content of the flame retardant (B) is preferably 40 mass % or less in consideration of obtaining good dispersibility in the polyimide resin (A) and a good appearance in the polyimide resin composition and the molded article.

The flame retardant (B) may be produced by a known method. Alternatively, commercially available phosphinic acid metal salt-based flame retardant may be used as the flame retardant (B). Examples of commercially available phosphinic acid metal salt-based flame retardants include "EXOLIT OP1230", "EXOLIT OP1240", "EXOLIT OP1400", "EXOLIT OP930", "EXOLIT OP935", "EXOLIT OP945TP", and the like, manufactured by Clariant Chemicals KK.

The flame retardant (B) can be used alone or can be used in combinations of two or more thereof.

The content of the phosphinic acid metal salt-based flame retardant (B) in the polyimide resin composition is preferably 0.1 to 20 mass %, more preferably 0.5 to 15 mass %, and further preferably 1.0 to 12 mass %. When the content of the phosphinic acid metal salt-based flame retardant (B) is 0.1 mass % or more, an effect of improving flame resistance is obtained, and when the content is 20 mass % or less, a good appearance can be maintained.

<Additive>

In the polyimide resin composition of the present invention, additives may be mixed as required, such as a filler, a delusterant, a nucleating agent, a plasticizer, an antistatic agent, an anti-coloring agent, an anti-gelling agent, a colorant, a slidability-improving agent, an antioxidant, a conducting agent, and a resin-modifying agent.

The amount of the above additive mixed is not particularly limited, and usually 50 mass % or less, preferably 0.0001 to 30 mass %, more preferably 0.001 to 15 mass %, and further preferably 0.01 to 10 mass % in the polyimide resin composition in consideration that the physical properties derived from the polyimide resin (A) are maintained and the effect of the additive is exerted.

Another resin other than the polyimide resin (A) may also be mixed in the polyimide resin composition of the present invention, without impairing the characteristics of the composition. Such another resin is preferably a high heat resistant thermoplastic resin, and examples thereof include a polyamide resin, a polyester resin, a polyimide resin other than the polyimide resin (A), a polycarbonate resin, a polyetherimide resin, a polyamideimide resin, a polyphenylene ether imide resin, a polyphenylene sulfide resin, a polsulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more selected from the group consisting of a polyether imide resin, a polyphenylene sulfide resin, and a polyether ether ketone resin are preferable in consideration of heat resistance, molding processability, strength and solvent resistance, and a polyphenylene sulfide resin is more preferable in consideration of high flame resistance.

When the polyimide resin (A) is used in combination with another resin, the rate of such another resin to be mixed is not particularly limited, without impairing the characteristics of the polyimide resin composition.

However, the total content of the polyimide resin (A) and the flame retardant (B) in the polyimide resin composition of the present invention is preferably 50 mass % or more, more preferably 70 mass % or more, and further preferably 80 mass % or more, in consideration of obtaining the effects of the present invention. The upper limit is 100 mass %.

Although the polyimide resin composition of the present invention can take any form, it is preferably a pellet.

Since the polyimide resin composition of the present invention and the polyimide resin (A) used for it have thermoplasticity, for example, the polyimide resin (A), the flame retardant (B), and various optional components are added together as necessary and dry blended, then melt-kneaded in an extruder to extrude a strand, which can then be cut into pellets. A molded article having a desired shape can be easily produced by introducing the pellets into various molding machines and heat-molding by the method described below.

In the above-described production process of the pellets, and in the heat-molding process, usually, the flame retardant tends to bleed-out or undergo thermal decomposition, discoloring, whitening or the like. However, these problems are less likely to occur in the polyimide resin composition of the present invention, and a good appearance can be maintained.

<Flame Resistance>

The polyimide resin composition of the present invention has flame resistance with a high V-0 level in a flammability test by a vertical flammability test method in accordance with the UL94 standard, which is a flame resistance test standard for plastic materials published by Underwriters Laboratories Inc. Specifically, the flame resistance can be evaluated by the method described in the Examples.

[Molded Article]

The present invention provides a molded article including the polyimide resin composition.

Since the polyimide resin composition of the present invention has thermoplasticity, the molded article of the present invention can be easily produced by heat-molding. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step. Heat molding is preferable because molding is enable without setting the molding temperature to an elevated temperature more than 400° C., for example. Among these, injection molding is preferably performed because such molding can be performed without the molding temperature and the mold temperature in molding being set at high temperatures. For example, injection molding can be performed at a molding temperature of preferably 400° C. or less and more preferably 360° C. or less and a mold temperature of preferably 260° C. or less and more preferably 220° C. or less.

The method for producing a molded article preferably includes the step of heat-molding the polyimide resin composition at from 290 to 350° C. Although heat molding can be performed at a temperature more than 350° C. to 390° C., heat molding is preferably performed at a temperature of 350° C. or less in consideration of suppression of deterioration in the polyimide resin (A), another resin component, and various fillers. Examples of the specific procedure include the following methods. Firstly, the flame retardant (B) and the various optional components are added as necessary to the polyimide resin (A) and dry blended, then introduced into an extruder, and melt-kneaded and extruded in an extruder at preferably 290 to 350° C. to prepare pellets.

Alternatively, the polyimide resin (A) is introduced into the extruder, melted at preferably 290 to 350° C., then the flame retardant (B) and the various optional components are introduced as necessary into the extruder, and melt-kneaded and extruded in the extruder with the polyimide resin (A) to prepare the pellets.

The pellets may be dried, then introduced in various kinds of molding machines, and heat-molded preferably at from 290 to 350° C., thereby producing a molded article having a desired shape.

Since the polyimide resin composition of the present invention may be heat-molded by extrusion molding or the like at a relatively low temperature of from 290 to 350° C., the polyimide resin composition is excellent in molding processability and may be easily produced into a molded product having a desired shape. The temperature of the heat molding is preferably from 310 to 350° C.

The polyimide resin composition of the present invention is thermoplastic, and therefore has molding processability and that can achieve both high flame resistance and a good appearance. Therefore, the polyimide resin composition can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, carbon UD tape, thermal insulation materials, and the like. The molded articles, which are excellent in mechanical properties and heat resistance, also can replace various metals including aluminum alloys and magnesium alloys.

EXAMPLES

The present invention will be described in more detail with reference to examples below, but the present invention is not limited thereto. Various measurements and evaluations in each Production Example, Example, and Reference Example were carried out in the following manners.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity p was obtained according to the following expression.

$\mu = \ln(ts/t_0)/C$ $t_0$: elapsed time for flowing concentrated sulfuric acid
$ts$: elapsed time for flowing polyimide resin solution
C: 0.5 g/dL <Melting Point, Glass Transition Temperature, Crystallization Temperature, and Exothermic Amount of Crystallization>

The melting point Tm, the glass transition temperature Tg, the crystallization temperature Tc, and the exothermic amount of crystallization ΔHm of the polyimide resin or polyimide resin composition were measured with a differential scanning calorimeter ("DSC-6220", produced by SII Nanotechnology, Inc.).

The polyimide resin or polyimide resin composition was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

A polyimide resin having a crystallization half-time of 20 seconds or less was measured under such conditions that in a nitrogen atmosphere, the polyimide resin was held at 420° C. for 10 minutes for melting the polyimide resin completely, and then quenched at a cooling rate of 70° C./min, during which the time required from the appearance of the crystallization peak observed to the peak top thereof was calculated for determining the crystallization half-time.

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Particle Size <D50>>

The particle diameter (D50) of the flame retardant was measured by laser diffraction-type particle size analysis.

A laser diffracted light scattering particle size distribution analyzer "LMS-2000e" produced by Malvern Panalytical Ltd., was used as the measuring device. Water was used as the dispersion medium, and the measurement was carried out in conditions in which the flame retardant sufficiently disperses under ultrasonic conditions. The measuring range was set to 0.02 to 2000 μm.

<Bending Strength and Flexural Modulus>

The polyimide resin composition obtained in each of Examples was used to prepare a molded article of 80 mm×10 mm×4 mm in thickness prescribed in ISO 316, which was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

<Heat Deformation Temperature (HDT)>

The polyimide resin composition obtained in each of the Examples was used to prepare a molded article of 80 mm×10 mm×4 mm in thickness, which was used for measurement. A HDT tester "Auto-HDT3D-2" (produced by Toyo Seiki Seisaku-sho, Ltd.) was used to measure the heat deformation temperature under conditions including a distance between supports of 64 mm, a load of 1.80 MPa, and a heating rate of 120° C./hour.

<Flame Resistance>

The polyimide resin composition obtained in each of the Examples was used to prepare a molded article of 80 mm×10 mm×4 mm in thickness, which was used for flame resistance evaluation. Using the molded article a flammability test by a vertical flammability test method was carried out (n=5) in accordance with the UL94 standard, which is a flame resistance test standard for plastic materials published by Underwriters Laboratories Inc., and the flame resistance rank (V-0, V-1, V-2) was evaluated. If the flame resistance rank is V-0, this means that the flame resistance is good. Cases where the flame resistance did not reach V-2 were classified as "non-standard". For the polyimide resin compositions of Examples 4 to 7, a molded article of 127 mm×13 mm×1.6 mm in thickness was prepared and used for flame resistance evaluation. For the polyimide resin compositions of Examples 4 to 6, a molded article of 127 mm×13 mm×0.8 mm in thickness was prepared and used for flame resistance evaluation.

<Appearance>

The polyimide resin composition obtained in each of the Examples was used to prepare a molded article of 80 mm×10 mm×4 mm in thickness. The appearance of the molded article was visually observed and evaluated according to the following criteria.
  AA: Good appearance with no whitening or browning
  A: Part of the molded article whitened, or browned during the molding process, but there is substantially no problem for practical use
  B: Dazzle or browning seen over the whole molded article
  C: Bleed-out of the flame retardant or strong browning occurs, resulting in poor appearance <Strand Extrudability>

The strand extrudability of the polyimide resin composition was evaluated according to the following criteria.
  A: Constant strand diameter maintained, and continuous extrusion possible without breaking
  B: Strand seen to pulsate, and the diameter is unstable, or faint smoke is seen, continuous extrusion possible without breaking
  C: Strand breaks or strong smoke is generated, and continuous extrusion is difficult

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl)cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.0100 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring v (C=O) observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of the polyimide resin in Production Example 1 are shown in Table 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in the total tetracarboxylic acid component) | Diamine component (mol % in the total diamine component) | | | | | Exothermic amount of crystallization | Crystallization | |
| --- | --- | --- | --- | --- | --- | --- | --- | --- | --- | --- |
| | | PMDA | 1,3-BAC | OMDA | (1)/{(1) + (2)} (mol %) | Tm (° C.) | Tg (° C.) | Tc (° C.) | ΔHm (mJ/mg) | half-time (second) | Mw |
| Production Example 1 | Polyimide resin 1 | 100 | 35 | 65 | 35 | 323 | 184 | 266 | 21.0 | <20 | 55,000 |

Abbreviations in the Table 1 are as follows.
  PMDA: pyromellitic dianhydride
  1,3-BAC: 1,3-bis(aminomethyl)cyclohexane
  OMDA: 1,8-octamethylenediamine Examples 1 to 9 and Reference Examples 1 to 10
(Production and Evaluation of Polyimide Resin Composition)

The polyimide resin 1 obtained in Production Example 1, the flame retardant shown in Table 2, and the other components were sufficiently mixed by dry blend. The resulting mixed powder was extruded at a barrel temperature of 350° C. and a screw rotation speed of 70 rpm with Labo Plasto Mill (produced by Toyo Seiki Seisaku-Sho, Ltd.) which is an extruder. A strand extruded from the extruder was cooled in air and then pelletized with a pelletizer ("Fan Cutter FC-Mini-4/N", produced by Hoshi Plastic Co., Ltd.). The obtained pellets (polyimide resin composition) were dried at 190° C. for 10 hours and then used in injection molding.

The injection molding was performed at a barrel temperature of 350° C. and a mold temperature of 200° C., and a molding cycle of 50 seconds with an injection molding machine ("ROBOSHOT α-S30iA", produced by FANUC Corporation), thereby preparing a molded article having a desired shape to be used in the various evaluations.

Using the obtained pellets (polyimide resin composition) or prepared molded articles, various evaluations were carried out by the methods described above. The results are shown in Table 2.

TABLE 2

| | | | | | Example | | | | | | | | | Comparative Example |
|---|---|---|---|---|---|---|---|---|---|---|---|---|---|---|
| | | | | | 1 | 2 | 3 | 4 | 5 | 6 | 7 | 8 | 9 | 1 |
| Resin composition blend (parts by mass) | (A) | (A1) Polyimide resin 1 | | | 90 | 90 | 90 | 90 | 90 | 92 | 93 | 93 | 48 | 100 |
| | (B) | (B1) EXOLIT OP1230 | | | 10 | | | | | | | | | |
| | | (B2) EXOLIT OP1240 | | | | 10 | | | | | | | | |
| | | (B3) EXOLIT OP1400 | | | | | 10 | | | | | | | |
| | | (B4) EXOLIT OP930 | | | | | | 10 | 9.5 | 8 | 7 | | 4 | |
| | | (B5) EXOLIT OP945TP | | | | | | | | | | 7 | | |
| | Flame retardant other than (B) | (b1) PX-202 | | | | | | | | | | | | |
| | | (b2) Polyflon MPA FA-500H | | | | | | | | 0.5 | | | | |
| | | (63) PHOSMEL-200 | | | | | | | | | | | | |
| | | (b4) EXOLIT HP7010 | | | | | | | | | | | | |
| | Other | Glass fiber | | | | | | | | | | | 48 | |
| | | Talc | | | | | | | | | | | 0.3 | |
| | | Antioxidant | | | | | | | | | | | 0.2 | |
| Evaluation results | Thermal properties | Tm | ° C. | | 324 | 326 | 325 | 324 | 323 | 324 | 324 | 323 | 323 | 323 |
| | | Tg | ° C. | | — | — | — | — | — | — | — | — | — | 184 |
| | | Tc | ° C. | | 274 | 281 | 275 | 272 | 287 | 275 | 275 | 279 | 278 | 266 |
| | | ΔHm | mJ/mg | | 24 | 24 | 24 | 24 | 25 | 24 | 24 | 23 | 11 | 21 |
| | Mechanical properties | Bending strength | MPa | | 115 | 113 | 112 | 112 | 112 | 118 | 122 | 125 | 202 | 113 |
| | | Flexural modulus | GPa | | 3.2 | 3.1 | 3.0 | 3.1 | 3.2 | 3.1 | 3.1 | 3.3 | 16.3 | 2.4 |
| | HDT | High load (1.80 MPa) | ° C. | | 174 | 175 | 175 | 174 | 175 | 177 | 177 | 174 | 282 | 169 |
| | Flame resistance | UL94 Flammability test (thickness 4 mm) | — | | V-0 | V-0 | V-0 | V-0 | V-0 | V-0 | V-0 | V-0 | V-0 | V-2 |
| | | UL94 Flammability test (thickness 1.6 mm) | — | | | | | V-0 | V-0 | V-0 | V-0 | | | |
| | | UL94 Flammability test (thickness 0.8 mm) | — | | | | | V-0 | V-0 | V-0 | | | | |
| | | Appearance | — | | A | A | A | AA | AA | AA | AA | AA | B | AA |
| | | Strand extrudability | — | | A | A | A | A | A | A | A | A | A | A |

| | | | | | Comparative Example | | | | | | | | |
|---|---|---|---|---|---|---|---|---|---|---|---|---|---|
| | | | | | 2 | 3 | 4 | 5 | 6 | 7 | 8 | 9 | 10 |
| Resin composition blend (parts by mass) | (A) | (A1) Polyimide resin 1 | | | 95 | 90 | 99.5 | 99 | 94.8 | 94 | 90 | 95 | 90 |
| | (B) | (B1) EXOLIT OP1230 | | | | | | | | | | | |
| | | (B2) EXOLIT OP1240 | | | | | | | | | | | |
| | | (B3) EXOLIT OP1400 | | | | | | | | | | | |
| | | (B4) EXOLIT OP930 | | | | | | | | | | | |
| | | (B5) EXOLIT OP945TP | | | | | | | | | | | |
| | Flame retardant other than (B) | (b1) PX-202 | | | 5 | 10 | | | 5 | 5 | | | |
| | | (b2) Polyflon MPA FA-500H | | | | | 0.5 | 1 | 0.2 | 1 | | | |
| | | (63) PHOSMEL-200 | | | | | | | | | 10 | | |
| | | (b4) EXOLIT HP7010 | | | | | | | | | | 5 | 10 |
| | Other | Glass fiber | | | | | | | | | | | |
| | | Talc | | | | | | | | | | | |
| | | Antioxidant | | | | | | | | | | | |
| Evaluation results | Thermal properties | Tm | ° C. | | 321 | 322 | 323 | 323 | 321 | 324 | 320 | 326 | 324 |
| | | Tg | ° C. | | 170 | 165 | 185 | 185 | 165 | 167 | — | — | — |
| | | Tc | ° C. | | 268 | 269 | 282 | 279 | 278 | 283 | 268 | 270 | 269 |
| | | ΔHm | mJ/mg | | 22 | 22 | 23 | 24 | 23 | 24 | 20 | 22 | 21 |
| | Mechanical properties | Bending strength | MPa | | 125 | 131 | 124 | 127 | 128 | 130 | 112 | 125 | 127 |
| | | Flexural modulus | GPa | | 2.5 | 2.7 | 2.6 | 2.7 | 2.8 | 3.0 | 3.0 | 2.6 | 2.6 |
| | HDT | High load (1.80 MPa) | ° C. | | 154 | 141 | 177 | 177 | 152 | 156 | 170 | 172 | 173 |

TABLE 2-continued

| | | | | | | | | | | | |
|---|---|---|---|---|---|---|---|---|---|---|---|
| Flame resistance | UL94 Flammability test (thickness 4 mm) | — | V-2 | V-2 | *2 | *2 | V-2 | *3 | V-0 | V-2 | V-2 |
| | UL94 Flammability test (thickness 1.6 mm) | — | | | | | | | | | |
| | UL94 Flammability test (thickness 0.8 mm) | — | | | | | | | | | |
| Appearance | | — | AA | C | AA | AA | AA | AA | C | AA | B |
| Strand extrudability | | — | A | B | A | B | A | B | C | A | A |

*1 "—" indicates that Tg was not observed
*2: Of n = 5, four were V-2, and one was non-standard
*3: Of n = 5, three were V-0, and one each was V-1 and V-2

The details of each component shown in Table 2 are as follows.

<Polyimide Resin (A)>

(A1) Polyimide resin 1 obtained in Production Example 1, Mw: 55,000

<Flame Retardant (B)>

(B1) EXOLIT OP1230: Phosphinic acid metal salt-based flame retardant (aluminum diethylphosphinate) represented by the following structural formula (ii), produced by Clariant Chemicals K.K., particle size (D50): 27 μm, phosphorus content: 23 mass %

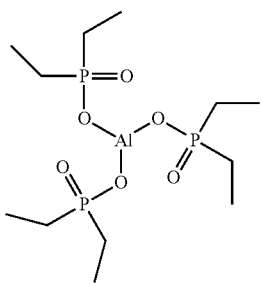

(ii)

(B2) EXOLIT OP1240: Phosphinic acid metal salt-based flame retardant, produced by Clariant Chemicals K.K., particle size (D50): 31 μm, phosphorus content: 23 mass %

(B3) EXOLIT OP1400: Phosphinic acid metal salt-based flame retardant, produced by Clariant Chemicals K.K., particle size (D50): 20 μm, phosphorus content: 25 mass %

(B4) EXOLIT OP930: Phosphinic acid metal salt-based flame retardant (aluminum diethylphosphinate) represented by structural formula (ii), produced by Clariant Chemicals K.K., particle size (D50): 4 μm, phosphorus content: 23 mass %

(B5) EXOLIT OP945TP: Phosphinic acid metal salt-based flame retardant (aluminum diethylphosphinate) represented by structural formula (ii), produced by Clariant Chemicals K.K., particle size (D50): 1.3 μm, phosphorus content: 23 mass %

<Flame Retardants Other than (B)>

(b1) PX-202: Aromatic phosphoric acid ester represented by the following structural formula, produced by DAI-HACHI CHEMICAL INDUSTRY CO., LTD.

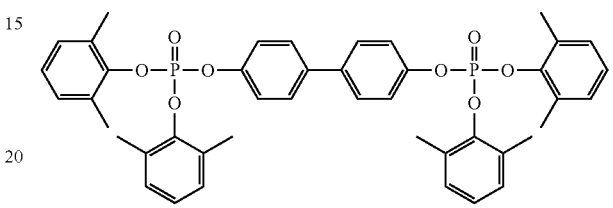

(b2) Polyflon MPA FA-500H: Polytetrafluoroethylene, produced by Daikin Industries, Ltd.

(b3) PHOSMEL-200: Polyphosphoric acid-melamine-based salt compound, produced by Nissan Chemical Industries, Ltd.

(b4) EXOLIT HP7010: Brominated polystyrene, produced by Clariant Chemicals KK.

Other Components

Glass fiber: "ECS 03 T-786H", produced by Nippon Electric Glass Co., Ltd., average fiber diameter: 10.5 μm, average fiber length: 3 mm Talc: "NANO ACE D-800", produced by Nippon Talc Co., Ltd., average particle size (D50): 0.8 μm Antioxidant: Hindered phenol-based antioxidant ("Irganox 1010", produced by BASF Japan Ltd.)

As shown in Table 2, the polyimide resin compositions of Examples 1 to 9 containing the predetermined polyimide resin (A) and flame retardant (B) exhibited high flame resistance, and the appearance of the molded article and the strand extrudability were also good. Mechanical properties and heat resistance were also good. In contrast, the polyimide resin compositions of Comparative Examples 1 to 10 could not achieve both flame resistance and a good appearance.

INDUSTRIAL APPLICABILITY

The polyimide resin composition of the present invention is excellent in molding processability and that can achieve both high flame resistance and a good appearance. The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, carbon UD tape, thermal insulation materials, and the like. The molded articles, which are excellent in

The invention claimed is:

1. A thermoplastic polyimide resin composition, comprising:
   a thermoplastic polyimide resin; and
   a phosphinic acid metal salt-based flame retardant comprising aluminum diethylphosphinate,
   wherein a total content of the thermoplastic polyimide resin and the phosphinic acid metal salt-based flame retardant in the thermoplastic polyimide resin composition is 80 mass % or more, and the thermoplastic polyimide resin comprises a repeating structural unit of formula (1) and a repeating structural unit of formula (2):

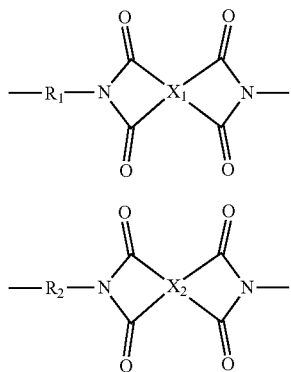

where $R_1$ is a divalent group having from 6 to 22 carbon atoms containing at least one alicyclic hydrocarbon structure, $R_2$ is a divalent chain aliphatic group having from 5 to 16 carbon atoms, and $X_1$ and $X_2$ each independently are a tetravalent group having from 6 to 22 carbon atoms containing at least one aromatic ring, a content ratio of the repeating structural unit of formula (1) with respect to a total of the repeating structural unit of formula (1) and the repeating structural unit of formula (2) is 20 mol % or more and less than 40 mol %, the thermoplastic polyimide resin has a melting point of 290° C. or more and 360° C. or less, the thermoplastic polyimide resin has a glass transition temperature of 150° C. or more and 250° C. or less, the thermoplastic polyimide resin has a weight average molecular weight of 10,000 to 150,000, a content of the phosphinic acid metal salt-based flame retardant in the thermoplastic polyimide resin composition is from 7 to 10 mass %, and a particle diameter (D50) of the phosphinic acid metal salt-based flame retardant is in a range of from 1 μm to 5 μm.

2. A molded article, comprising:
   the thermoplastic polyimide resin composition of claim 1.

3. The thermoplastic polyimide resin composition according to claim 1, wherein a form of the thermoplastic polyimide resin composition is a pellet.

4. The thermoplastic polyimide resin composition according to claim 1, wherein $R_1$ is a divalent group represented by formula (R1-3), $R_2$ is an alkylene group having from 8 to 10 carbon atoms, and $X_1$ and $X_2$ each are a tetravalent group represented by formula (X-5),

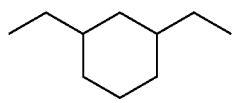

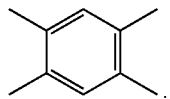

5. The thermoplastic polyimide resin composition according to claim 3, wherein $R_1$ is a divalent group represented by formula (R1-3), $R_2$ is an alkylene group having from 8 to 10 carbon atoms, and $X_1$ and $X_2$ each are a tetravalent group represented by formula (X-5),

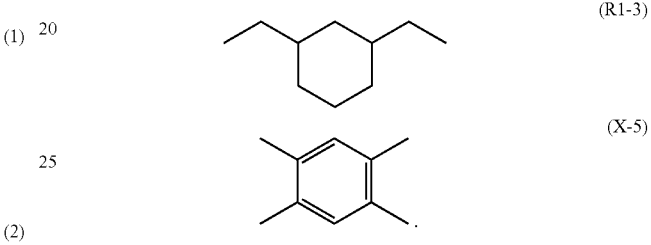

6. The thermoplastic polyimide resin composition according to claim 1, wherein the thermoplastic polyimide resin is present in the thermoplastic polyimide resin composition at a concentration of 90 mass % or more, and 93 mass % or less.

7. The thermoplastic polyimide resin composition according to claim 1, wherein:
   the thermoplastic polyimide resin is present in the thermoplastic polyimide resin composition at a concentration of 90 mass % or more, and 93 mass % or less, and
   the particle diameter (D50) of the phosphinic acid metal salt-based flame retardant is from 1.3 μm to 4 μm.

8. The thermoplastic polyimide resin composition according to claim 1, wherein:
   the thermoplastic polyimide resin is present in the thermoplastic polyimide resin composition at a concentration of 90 mass % or more, and 93 mass % or less,
   the particle diameter (D50) of the phosphinic acid metal salt-based flame retardant is from 1.3 μm to 4 μm, and
   $R_1$ is a divalent group represented by formula (R1-3), $R_2$ is an alkylene group having from 8 to 10 carbon atoms, and $X_1$ and $X_2$ each are a tetravalent group represented by formula (X-5),

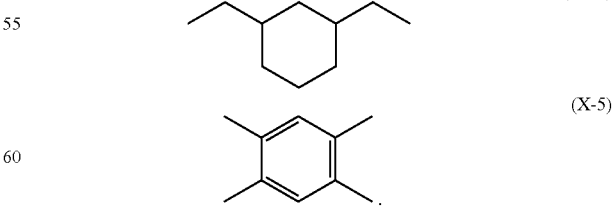

* * * * *